United States Patent Office 3,437,438
Patented Apr. 8, 1969

3,437,438
PRODUCTION OF PHOSPHOROUS ACID
Robert L. Carroll and Riyad R. Irani, St. Louis, Mo., assignors to Monsanto Company, St. Louis, Mo., a corporation of Delaware
No Drawing. Filed Feb. 8, 1967, Ser. No. 614,536
Int. Cl. C01b 25/02
U.S. Cl. 23—165                                      16 Claims

ABSTRACT OF THE DISCLOSURE

Phosphorous acids are produced by hydrolyzing a phosphorus trihalide, such as phosphorus triiodide and phosphorus tribromide in the presence of an inert, water-immiscible organic solvent and thereafter separating the phosphorous acid from the hydrogen halide and the organic solvent. If desired, the phosphorus trihalide can be produced by reacting phosphorus and the halogen in the solvent. Additionally, the hydrogen halide can be oxidized to the molecular halogen for reuse. Furthermore, certain oxidizing agents for oxidizing the hydrogen halide to molecular halogen can be regenerated by air oxidation, thus enabling the production of phosphorous acids by a process which consumes only elemental phosphorus, water and air as raw materials.

---

This invention relates to the production of phosphorous acids. More particularly, it relates to the production of phosphorous acids by the hydrolysis of a phosphorus trihalide in the presence of a liquid, inert, water-immiscible organic solvent.

The phosphorous acids that are produced by the process of this invention are orthophosphorous acid, pyrophosphorous acid and mixtures thereof. Orthophosphorous acid has the formula, $H_3PO_3$, and can be produced in the anhydrous form or aqueous solutions of orthophosphorous acid can be produced. Pyrophosphorous acid has the formula, $H_4P_2O_5$. Mixture of orthophosphorous acid and pyrophosphorous acid can generally be characterized by their $P_2O_3$ content, that is, from about 67% $P_2O_3$ to about 75% by weight.

The hydrolysis of phosphorus trihalides to form phosphorous acids has heretofore been difficult to control. The hydrolysis of phosphorus trichloride to pyrophosphorous acid is particularly difficult because of the tendency for pyrophosphorous acid to hydrolyze to orthophosphorous acid. Additionally, the hydrolysis of phosphorus trichloride occurs quite rapidly and unless extreme temperature control measures are taken, relatively large amounts of polymeric materials are formed which adversely affect the yields and purity of the pyrophosphorous acids. By the practice of this invention, the formation of these polymeric materials is largely overcome, and, if desired, relatively pure pyrophosphorous acid can be produced. It is believed, therefore, that the process of this invention is an advancement in the art.

In accordance with this invention, it has been found that phosphorus trihalides selected from the group consisting of phosphorus triiodide and phosphorus tribromide can be hydrolyzed to phosphorous acids and the corresponding hydrogen halide in the presence of an inert, water-immiscible organic solvent. It is an added advantage of this invention that the phosphorus trihalide, which is hydrolyzed to phosphorous acid, can be produced in situ by dissolving phosphorus and a molecular halogen selected from the group consisting of iodine and bromine in the liquid, inert, water-immiscible organic solvent and maintaining the resulting mixture at reaction conditions for a sufficient time to form phosphorus trihalide. This aspect enables the production of the phosphorous acids directly from elemental phosphorus. If desired, the halogen can be regenerated from the hydrogen halide that is formed during the hydrolysis by oxidation. Also the organic solvent can be recovered and recycled. Under this preferred aspect of the invention, the phosphorous acids are produced in a process which consumes only elemental phosphorus and water as major raw materials.

One additional preferred aspect of this invention is to use iodine as the halogen and to oxidize the resulting hydrogen iodide by a chemical oxidizing agent which in its reduced form, after the oxidation of the hydrogen iodide, can also be relatively easily oxidized to form the original oxidizing agent. For example, nitric acid can be used as an oxidizing agent which reduces to nitric oxide when it oxidizes hydrogen iodide to molecular iodine. The nitric oxide can be oxidized by molecular oxygen to form nitrogen dioxide which, upon reaction with water, forms nitric acid. This aspect enables the regeneration of the halogen from hydrogen halide, consuming only air, thus adding to the economic advantages of the process for producing the phosphorous acids.

Although both phosphorus triiodide and phosphorus tribromide can be used to produce the phosphorous acids by the process of this invention, it is generally preferred to use phosphorus triiodide since its hydrolysis rate, while more rapid than the hydrolysis rate of phosphorus tribromide, can be controlled. As mentioned previously, the hydrolysis of phosphorus trichloride is extremely difficult to control. Also, if regeneration of the halogen is desired, iodine is generally more easily recovered from hydrogen iodide than bromine is from hydrogen bromide. In most instances, regeneration and recycle of the halogen will be desired because of economic considerations.

The organic solvents which are generally suitable in the practice of this invention are those which are liquid and water-immiscible and are inert to the phosphorus trihalides, the phosphorous acids and hydrogen halide. By liquid, it is meant that the solvent is in the liquid state under process temperature conditions. "Water-immiscible" as used herein means that the solvent and water will form two separate and distinct phases after being mixed together and then are allowed to remain quiescent for a period of about one hour. If it is desired to react phosphorus and the halogen in the organic solvent to produce the phosphorus trihalide, it is necessary that the solvent be inert to phosphorus and the halogen. Typical organic solvents which are suitable include the aliphatic solvents of the group consisting of halogen substituted lower paraffins and sulfur substituted lower paraffins and the aromatic solvents from the group consisting of benzene and lower alkyl substituted benzene. As used herein, the terms "lower paraffins" and "lower alkyls" mean compounds and radicals containing from 1 to 4 carbon atoms. It is an added advantage of these solvents that phosphorus and iodine and bromine are soluble therein.

Illustrative examples of the foregoing compounds include carbon disulfide, carbon tetrachloride, chloroform, bromoform, benzene, ethyl disulfide, xylene, toluene, ethyl bromide, propyl chloride, propyl bromide, propyl sulfide, butyl bromide, butyl chloride, butyl sulfide and the like. Of these, it is preferred to use those having a boiling point between about 20° C. and about 100° C. such as carbon disulfide, carbon tetrachloride, chloroform, benzene and ethyl bromide to enable separation of the solvent from the phosphorous acid by distillation at temperatures below about 100° C. Of these, carbon disulfide is especially preferred.

The particular phosphorous acid that is produced is dependent upon the amount of water used to hydrolyze the phosphorus trihalide. For example, if the water is in a weight ratio to the phosphorus of about 1.46:1, pyrophosphorous acid will be formed and at weight ratios of greater than about 1.46:1 and less than about 1.75:1 mixtures of orthophosphorous acid and pyrophosphorous acid are formed. If water is in a weight ratio to phosphorus of about 1.75:1, orthophosphorous acid is produced and if greater than about 1.75:1, an aqueous solution of orthophosphorous acid will be formed. When the ratio of water to phosphorus is greater than about 1.75:1, the hydrogen halide will also be dissolved in the water, whereas, when the ratio is below about 1.75, the hydrogen halide will normally be evolved during hydrolysis of the phosphorus trihalide.

In most instances when aqueous solutions of orthophosphorous acid are produced, it is preferred to use relatively large amounts of water, that is, a water to phosphorus weight ratio of from about 5:1 to about 50:1, to thereby enable separation of hydrogen halide and the solvent from orthophosphorous acid more readily.

As previously mentioned, the phosphorus trihalide can be formed and then added to the organic solvent and thereafter hydrolyzed, or the phosphorus trihalide can be prepared by reacting the phosphorus and the halogen in the organic solvent and thereafter hydrolyzed by adding water and mixing the water and the mixture of organic solvent and phosphorus trihalide. In some instances, it is preferred to react the phosphorus and halogen to form the phosphorus trihalide while adding water to the mixture of the organic solvent and phosphorus trihalide. In other instances, a two-phase system consisting of water and the organic solvent can be formed and then the beforementioned reactants are dissolved and reacted in the organic solvent to form the phosphorus trihalide and thereafter the two phases are admixed to achieve hydrolysis. Additionally, phosphorus trihalide can be added to the organic solvent phase and then the organic solvent and water are admixed to thereby hydrolyze the phosphorus trihalide.

The water is preferably dispersed relatively uniformly throughout the organic solvent in the practice of this invention to enable relatively rapid hydrolysis of the phosphorus trihalide. The mixing can be carried out in any conventional manner such as by flow mixers, jet mixers, injectors, turbulence mixers, circulating mixer systems, centrifugal pumps and the like; by paddle and propeller mixers of various designs as well as by turbine or centrifugal impeller mixers, colloid mills and homogenizers.

When the phosphorus trihalide is formed in situ, temperatures of from about 20° C. to about 100° C. are used to produce the phosphorus trihalide. It is preferred to conduct the reaction at a temperature of from about 35° C. to about 85° C. for optimum reaction rates and yields. Although conventional cooling methods such as cooling coils, evaporative cooling and the like can be used to control the temperature within the beforementioned range, it is generally preferred to use an organic solvent having a boiling point within the 20° C. to 100° C. range and then conduct the reaction at about the boiling point of the solvent. For example, when carbon disulfide is used as the organic solvent, the reaction can be conducted at about 46° C., the boiling point of the solvent, thereby enabling the temperature to be controlled easily.

Substantially stoichiometric amounts of phosphorus and halogen are used to form the phosphorus trihalide, that is, an atomic ratio of phosphorus to halogen of about 1:3, although up to about a 20% excess of either phosphorus or halogen is generally suitable. Since an excess of either reactant in most instances does not increase the yields in the process, a phosphorus to halogen atomic ratio of about 1:3 is generally preferred.

The particular separation technique employed to produce a phosphorous acid relatively free of the organic solvent and hydrogen halide will be dependent upon the phosphorous acid that is produced. As previously mentioned, when anhydrous phosphorous acids are produced, most of the halide is evolved during the hydrolysis, leaving essentially a mixture of organic solvent and the phosphorous acid. When water is present in an amount in excess of the amount required to hydrolyze the phosphorus trihalide to orthophosphorous acid and hydrogen halide, the hydrogen halide dissolves in the water. Distillation offers a relatively simple means for producing a phosphorous acid relatively free of the other components. As previously mentioned, it is preferred to use organic solvents having a boiling point from about 20° C. to about 100° C. so that the solvent can be removed by distillation at a temperature below about 100° C. thereby avoiding temperatures which approach the decomposition temperature of pyrophosphorous acid which is about 130° C.

When solutions of orthophosphorous acid are produced by using a water to phosphorus ratio of greater than about 1.75, it is preferred to separate the organic solvent, water and hydrogen halide as a mixture from the phosphorous acid by distillation and then regenerate the molecular halogen by oxidation of the halide to molecular halogen by electrochemical oxidation or chemical oxidation. If the solvent is present during the oxidation, the halogen dissolves in the organic solvent which can be returned for reuse. Hydrogen iodide and hydrogen bromide both form an azeotrope with water which boils at about 126° C. to about 127° C., thus most of the hydrogen halide is removed at this temperature by distillation at atmospheric temperature. Since orthophosphorous acid is stable at temperatures up to about 200° C., it is generally preferred to use atmospheric distillation although vacuum distillation can be used, if desired. When the anhydrous phosphorous acids are produced, the residual hydrogen halide and the solvent can be removed from the phosphorous acid by heating the mixture to about 100° C. under an absolute pressure of about 500 mm. Hg.

As previously mentioned, the hydrogen halide resulting from the hydrolysis of the phosphorus trihalide can be oxidized to the molecular halogen. Chemical oxidizing agents offer a relatively simple means of regeneration of the molecular halogen from an aqueous solution of hydrogen halide. Selection of the particular oxidizing agent will be dependent upon the hydrogen halide produced by the process of this invention. Generally speaking, the oxidizing agents which can be used are those which will oxidize the hydrogen halide to molecular halogen in an acidic aqueous medium and can be characterized by reference to their standard oxidation potentials in acidic mediums. The potential ($E°$ usually expressed in volts) of the particular oxidizing agent of its oxidation-reduction couple is compared to the potential of a hydrogen gas-hydrogen ion couple used as a standard generally taken at O, with the comparison conducted at 25° C. with their couples in their standard states. It is to be noted that the standard oxidation potential ($E°$) for iodide-iodine couple in acidic aqueous medium is reported as $-0.5355$ volt. Therefore, oxidizing agents which have standard oxidation potentials algebraically more negative than about $-0.54$ may be used for oxidizing hydrogen iodide. The bromide-bromine standard oxidation potential in acidic aqueous media is reported at $-1.52$ volts, therefore, the selection of oxidizing agents when bromine is used is more limited. As previously mentioned, phosphorus triiodide is the preferred phosphorus trihalide in the process of this invention, particularly when chemical regeneration of a halogen is used. Nitric acid, nitrous acid or the oxides of nitrogen are the preferred oxidizing agents since their reduced forms can be oxidized by air to nitrogen dioxide which can be absorbed in water to form nitric acid.

Hydrogen iodide in the vapor state can also be converted to molecular iodine by direct oxidation using either air or molecular oxygen over an acid active catalyst such as vanadium oxide, copper chloride, silica-alumina, and the like. This method, when using air, offers an inexpensive method for regeneration and is particularly preferred when anhydrous phosphorous acids are produced. Furthermore, it can be conducted while the hydrogen iodide is in the vapor state by passing air and the vaporized hydrogen iodide through a catalyst bed, thus eliminating the condensation of the hydrogen iodide and water, which is generally necessary in other methods of recovery. Another useful method of vapor or liquid state oxidation of hydrogen iodide is to use an air stream containing a small amount of nitrogen dioxide (about 5% nitrogen dioxide or nitric oxide) which appears to catalyze the oxidation reaction. The amount of the foregoing oxides of nitrogen in the air stream can be less than 5% by volume and still achieve the catalytic effect upon oxidation at a pressure of about four pounds per square inch gauge and at about 25° C. Higher temperatures such as up to about 130° C. can be used if faster regeneration rates are desired.

An additional method for regenerating molecular halogen from hydrogen halide is by use of an electrolytic cell. In this method an electromotive force (EMF) is applied to the electrodes, preferably a platinum cathode and a graphite anode, which are immersed in an aqueous solution of hydrogen halide. It is necessary to keep the EMF below about 2 volts to avoid oxygen being liberated from the solution at the anode. Therefore, the preferred EMF is from about 0.6 volt to about 1.2 volts to enable the generation of molecular iodine without the liberation of oxygen. A current density of from about 0.1 to about 0.3 ampere per square centimeter at the electrodes is generally preferred.

To illustrate this invention, the following detailed examples are presented. All parts and proportions and percentages are by weight unless otherwise given.

Example I

About 3150 parts of carbon disulfide and about 4000 parts of water are charged to a reaction vessel equipped with a stirrer and allowed to separate into two phases. About 125 parts of phosphorus and about 1500 parts of molecular iodine are charged into the carbon disulfide phase. The temperature of the system is held at about 45° C. and after about 15 minutes, a representative sample of the first phase, as analyzed by nuclear magnetic resonance (NMR), indicates that essentially 100% of the phosphorus is contained as phosphorus triiodide. The water phase is mixed with the carbon disulfide phase to achieve complete hydrolysis of the phosphorus triiodide to orthophosphorous acid. The reaction mixture is heated to about 100° C. thereby removing, as a mixture, the carbon disulfide, hydrogen iodide and water from the orthophosphorous acid. To this mixture about 5000 parts of 4 N nitric acid are added. After about 30 minutes an analysis of a sample of the aqueous phase for iodide ions and an analysis of a sample of the carbon disulfide phase indicates essentially all of the hydrogen iodide has been converted to iodine. The carbon disulfide containing the dissolved iodine is suitable for reuse in a subsequent reaction with phosphorus.

Example II

About 60 parts of phosphorus and 740 parts of molecular iodine are charged into a vessel containing about 2000 parts of carbon disulfide. The system is heated to about 75° C. by conducting the reaction under pressure of about 50 pounds per square inch. This mixture is then mixed with about 1000 parts of water. The temperature is maintained at about 75° C. and then allowed to separate into two separate phases. Analysis of a sample of the aqueous phase using NMR indicates a yield of orthophosphorous acid of over about 95% based upon the phosphorus added. The aqueous phase is separated from the carbon disulfide phase and subjected to atmospheric distillation at about 100° C. to remove the hydrogen iodide as a vapor. While in the vapor phase, the hydrogen iodide is oxidized with nitrogen dioxide thereby producing iodine which is condensed and returned to the organic phase.

Example III

About 2100 parts of carbon disulfide and 700 parts of chloroform and 29.2 parts of water are charged into a reaction vessel equipped with a cooling coil. About 270 parts of iodine are dissolved in the organic solvent and about 20 parts of phosphorus are added over a period of three hours. The phosphorus is added in equal portions at intervals of about 15 minutes each and 5 minutes after the last portion of phosphorus is added, the two phases are mixed together. The hydrogen iodide evolves from the system and is recovered by absorbing the hydrogen iodide in water. The organic solvent and residual hydrogen iodide are removed from the pyrophosphorous acid by heating the mixture to about 100° C. An analysis of the pyrophosphorous acid by NMR shows essentially all of the phosphorus is contained as pyrophosphorous acid. The recovered and residual hydrogen iodide and carbon disulfide are charged to an electrolytic cell equipped with a platinum electrode and a graphite electrode. An EMF of about 2 volts and a current density of about 0.2 ampere/ $cm.^2$ is maintained at the electrodes. In about 30 minutes, analysis of the medium indicates essentially 100% regeneration of the iodide which is essentially all dissolved in the carbon disulfide.

Example IV

About 103 parts of yellow phosphorus are added to about 1740 parts of carbon disulfide which forms one phase of a two-phase system. The other phase contains about 150 parts of water. About 800 parts of bromine are added to the carbon disulfide phase over about a one hour period. The two phases are mixed together by stirring. The temperature is controlled at about 50° C. and the carbon disulfide and excess bromine evolve from the reaction medium. After the material is hydrolyzed, NMR analysis indicates that greater than 99% of the phosphorus is contained as $H_3PO_3$. Residual hydrogen bromide is distilled off by raising the temperature of the remaining mixture to about 100° C. leaving essentially pure orthophosphorous acid.

Example V

About 100 parts of yellow phosphorus are added to about 1000 parts of carbon tetrachloride and about 1000 parts of water and the mixture is heated to about 77° C. About 800 parts of bromine are added to the carbon tetrachloride over a period of about 2 hours. After the completion of the bromine addition, the mixture is agitated for about 30 minutes. Analysis of the mixture shows no oxo acids of phosphorus other than orthophosphorous acid. The excess bromine, solvent and about 200 parts of the water are removed by heating the mixture to about 100° C.

Stoichiometrically equivalent amounts of iodine can be substituted for the bromine of this example with equally good results. Furthermore, carbon disulfide, chloroform, benzene and ethyl bromide in essentially equal weight amounts can each be substituted for the carbon tetrachloride in this example with equally good results.

Example VI

About 400 parts of phosphorus triiodide are charged to about 2000 parts of carbon disulfide to form a mixture at a temperature of about 40° C. About 585 parts of water are added to the carbon disulfide-phosphorus triiodide mixture over a period of about 10 minutes. The temperature is maintained at about 40° C. while the water is being added.

Hydrogen iodide is evolved from the mixture and is recovered by absorbing in water. The solution of hydrogen iodide is transferred to a vessel containing about 1000 parts of 30% nitric acid whereby the hydrogen iodide is converted to molecular iodine.

The carbon disulfide is removed by heating the mixture to about 57° C. and an analysis of a sample of the material remaining indicates more than 90% of the oxo-acids of phosphorus acid present are phosphorous acids.

What is claimed is:

1. A process for producing phosphorous acid comprising hydrolyzing a phosphorus trihalide selected from the group consisting of phosphorus tribromide and phosphorus triiodide in the presence of an inert, liquid, water-immiscible organic solvent selected from the group consisting of halogen substituted lower paraffins, sulfur substituted lower paraffins, benzene, lower alkyl substituted benzene and mixtures thereof to thereby form phosphorous acid and a hydrogen halide and separating said phosphorous acid from said hydrogen halide and said solvent.

2. A process according to claim 1 wherein said phosphorus trihalide is formed by reacting phosphorus and a halogen selected from iodine and bromine dissolved in said solvent at a temperature of from about 20° C. to about 100° C.

3. A process according to claim 2 wherein during said hydrolysis water is present in a weight ratio to phosphorus of from about 1:45 to about 50:1.

4. A process according to claim 3 wherein said hydrogen halide and said phosphorous acid are separated, said hydrogen halide is oxidized to molecular halogen for reuse as a reactant.

5. A process according to claim 4 wherein said phosphorus trihalide is phosphorus triiodide.

6. A process according to claim 5 wherein said solvent is carbon disulfide.

7. A process according to claim 2 wherein said phosphorus trihalide is phosphorus triiodide.

8. A process according to claim 7 wherein said solvent is carbon disulfide.

9. A process according to claim 8 wherein water is present during said hydrolysis in a weight ratio to phosphorus of from about 1:45 to about 50:1.

10. A process according to claim 9 wherein after said hydrogen halide and said phosphorous acid are separated, said hydrogen iodide is oxidized to molecular halogen for reuse as a reactant.

11. A process according to claim 10 wherein nitric acid is used to oxidize said hydrogen iodide.

12. A process according to claim 2 wherein said solvent is a sulfur substituted lower paraffin.

13. A process according to claim 12 wherein during said hydrolysis water is present in a weight ratio to phosphorus of from about 1:45 to about 50:1.

14. A process according to claim 13 wherein said water to phosphorus weight ratio is from about 1.75:1 to about 50:1 whereby orthophosphorous acid is produced.

15. A process according to claim 14 wherein said solvent is carbon disulfide.

16. A process according to claim 15 wherein said halogen is iodine.

References Cited

UNITED STATES PATENTS 2,670,274   2/1954   Jones _____ 23—165

OTHER REFERENCES

Van Wazer: "Phosphorus and its Compounds," vol. 1, pp. 220, 221, 227 and 228 (1958).

OSCAR R. VERTIZ, *Primary Examiner.*

A. GREIF, *Assistant Examiner.*